(No Model.) 5 Sheets—Sheet 1.
W. CLARK.
APPARATUS FOR DRIVING CUTTERS FOR CLIPPING HORSES, &c.
No. 578,915. Patented Mar. 16, 1897.
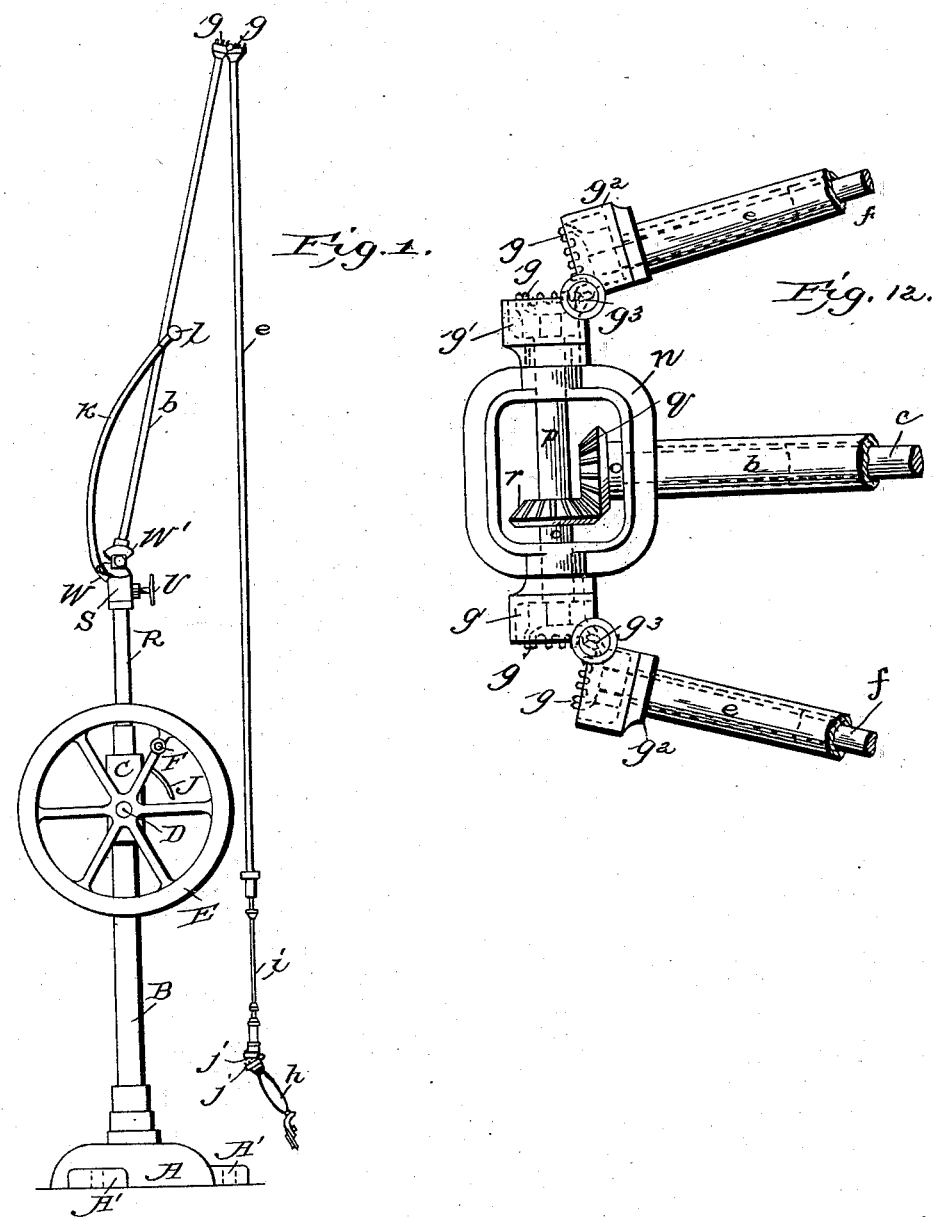

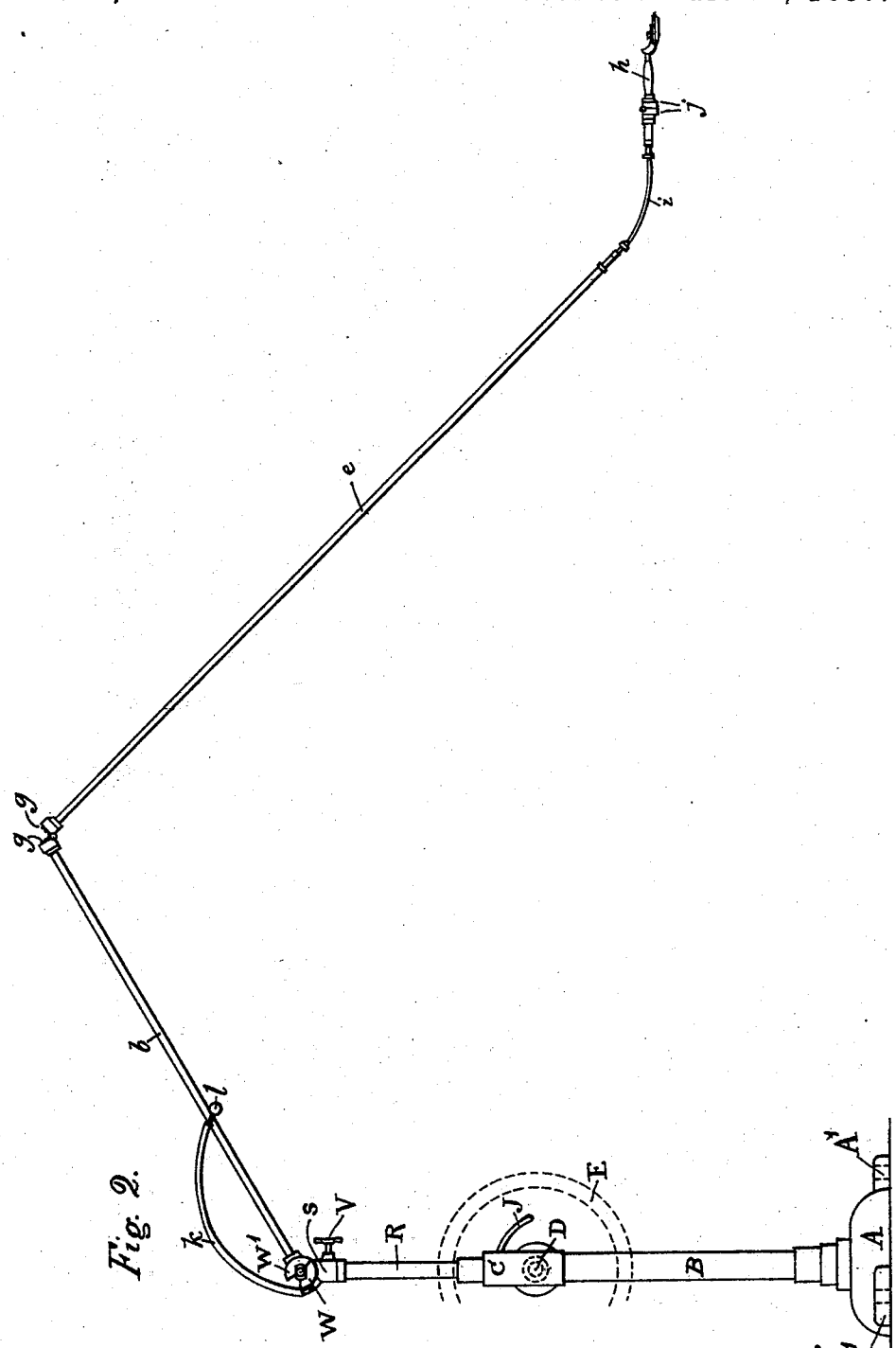

(No Model.)  5 Sheets—Sheet 3.
W. CLARK.
APPARATUS FOR DRIVING CUTTERS FOR CLIPPING HORSES, &c.
No. 578,915. Patented Mar. 16, 1897.
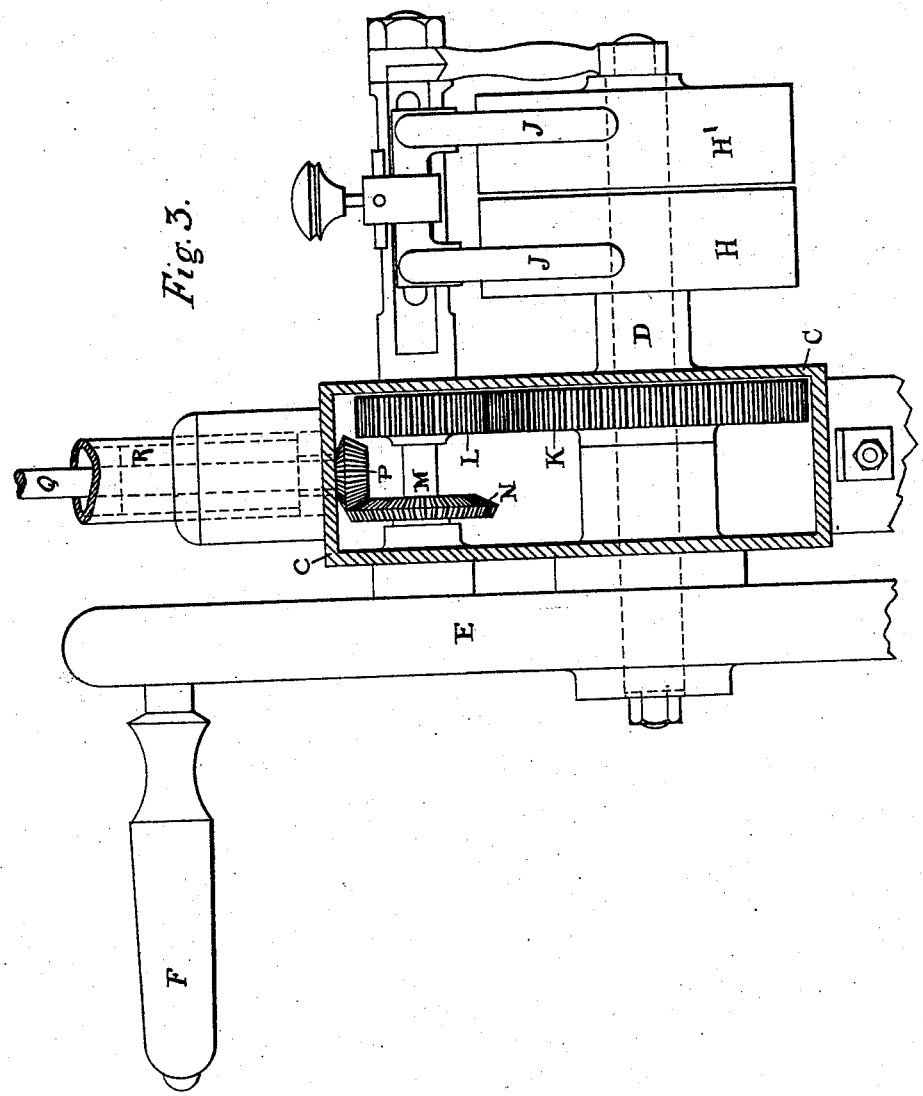

(No Model.) 5 Sheets—Sheet 4.
W. CLARK.
APPARATUS FOR DRIVING CUTTERS FOR CLIPPING HORSES, &c.
No. 578,915. Patented Mar. 16, 1897.
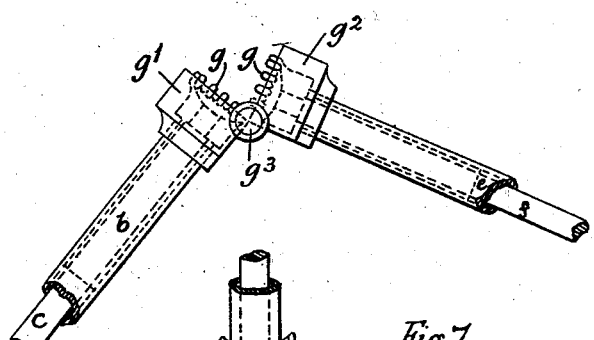
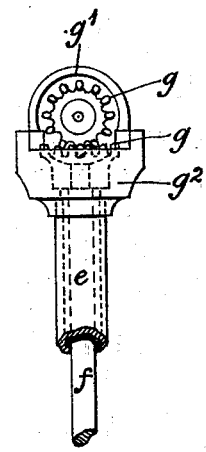
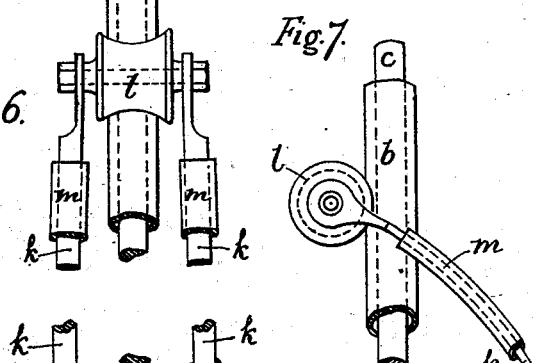
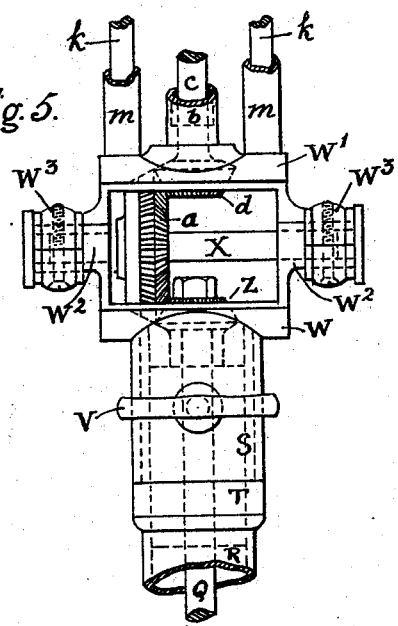
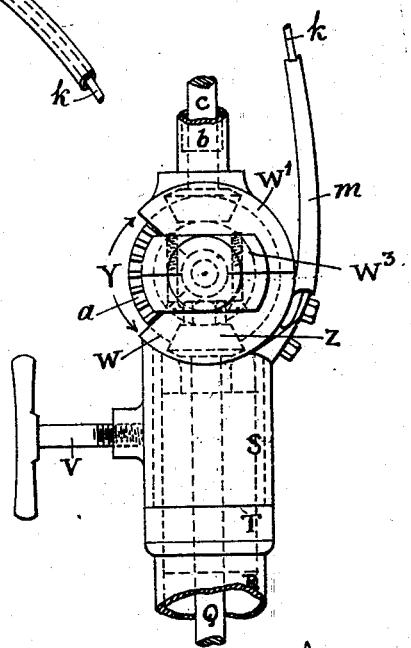
Witnesses
H. van Oldenneel
E. A. Scott
Inventor
William Clark
by ─── Attorneys (No Model.)  5 Sheets—Sheet 5.

W. CLARK.
APPARATUS FOR DRIVING CUTTERS FOR CLIPPING HORSES, &c.

No. 578,915. Patented Mar. 16, 1897.

Witnesses
H. van Oldenneel
E. A. Scott

Inventor
William Clark
by Menara
Attorneys

United States Patent Office.

WILLIAM CLARK, OF LONDON, ENGLAND.

APPARATUS FOR DRIVING CUTTERS FOR CLIPPING HORSES, &c.

SPECIFICATION forming part of Letters Patent No. 578,915, dated March 16, 1897.

Application filed November 9, 1895. Serial No. 568,467. (No model.) Patented in England March 18, 1887, No. 4,099, and March 20, 1888, No. 4,293.

*To all whom it may concern:*

Be it known that I, WILLIAM CLARK, a subject of the Queen of Great Britain and Ireland, and a resident of 528 Oxford Street, W. London, in the county of Middlesex, England, have invented certain new and useful Improvements in Apparatus for Driving Cutters for Clipping or Shearing Horses or other Animals, of which the following is a specification.

My invention relates mainly to improvements in the apparatus for driving cutters for clipping or shearing horses or other animals, for which Letters Patent in Great Britain were granted to me as follows: No. 4,099, bearing date March 18, 1887, and No. 4,293, bearing date March 20, 1888.

The main objects of my present invention are to effect such improvements in the construction of such driving apparatus as will simplify its manufacture and will give the operator more command over the clipping or shearing instrument by relieving the weight on the hand and causing the said instrument to work more steadily, rapidly, and with less vibration, while less power will be required to drive the apparatus.

Figure 11:
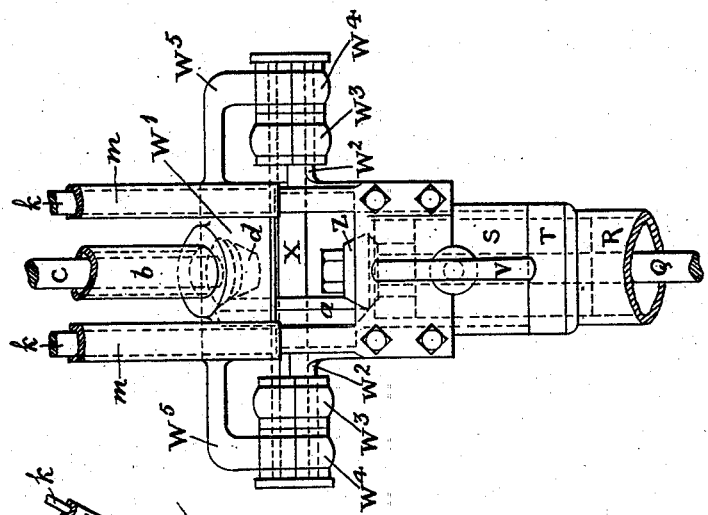
Figure 10:
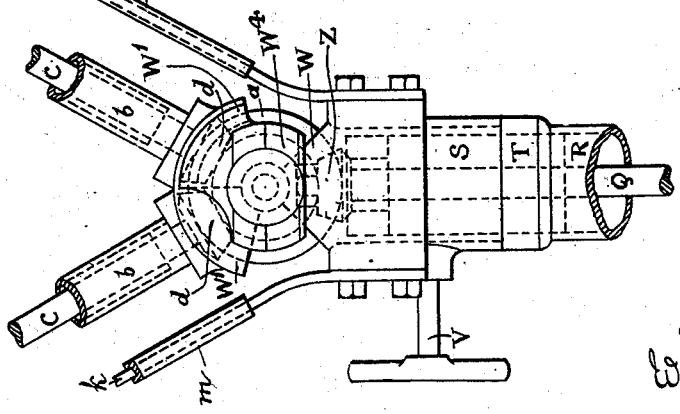

In the accompanying four sheets of drawings, which form part of this specification, and in which similar letters of reference denote similar parts throughout, Figure 1 is a side elevation of an improved driving apparatus constructed in accordance with my present invention, the parts being in or about the position automatically assumed when the apparatus is at rest; and Fig. 2 is a similar view showing the apparatus as extended when in use. Figs. 3, 4, 5, 6, 7, 8, and 9 are detail views, to an enlarged scale, of various parts of the mechanism; and Figs. 10, 11, and 12 are similar views showing modifications of certain parts of the said mechanism.

Referring first to Figs. 1 to 9, A is a baseplate provided with pierced lugs A' for attachment to a floor or other foundation by means of bolts or other suitable devices. A vertical standard B, which may conveniently be of a tubular form, as shown, is affixed to or may be made in one piece with the said base-plate. This standard has attached to it at its upper end a box or casing C. The said box, with the attendant mechanism, is shown on an enlarged scale most clearly in Fig. 3, which is a view at right angles to the position shown in Figs. 1 and 2.

D is a horizontal spindle journaled in the box and provided at one end with a fly-wheel E and handle F for rotation by hand and at the other end with fast and loose belt-pulleys H H' and belt-fork J for driving by power. A spur-wheel K is keyed on this spindle D and gears with a pinion L on a second horizontal spindle M, journaled in the upper part of the box C. A bevel-wheel N, also fixed on the spindle M, gears with a bevel-pinion P on the lower end of a vertical shaft Q, journaled within a tube or sheath R, affixed to the top of the box C and extending vertically above it. The standard B, together with the tube R, forms the main support.

Referring now more particularly to Figs. 4 and 5, which are elevations at right angles to each other, to an enlarged scale of the mechanism at the top of the tube R, S is a sleeve encircling and free to rotate upon the said tube and bearing on a collar T, but capable of being clamped in any required position by a thumb-screw V, provided for that purpose.

W W' is a box or casing formed in two parts. The lower part W is fixed to the top of or made in one piece with the sleeve S.

X is a horizontal spindle journaled in bearings $W^2$, projecting from the lower part W of the box, and the upper part W' of the box is also provided with projecting split bearings $W^3$, embracing the bearings $W^2$, so that the said part W' can rock through the space Y.

A bevel-pinion Z is fixed on the top of the shaft Q and gears with a bevel-wheel $a$ on the spindle X. A long light tube $b$ is fixed to the top half W' of the box and has journaled within it a light shaft $c$, having at its lower end a bevel-pinion $d$, gearing with the wheel $a$. By the combination of the rotating sleeve S, the rocking box W W', and the bevel-gearing Z $a$ $d$ the tube $b$ can be moved horizontally around the tube R and can assume various angles, as shown in Figs. 1 and 2, while in any position in which it can be placed the contained shaft $c$ will be able to be driven with equal facility from the vertical shaft Q.

Jointed to and hanging from the upper end of the tube $b$ is a longer and lighter tube $e$, having journaled within it a light shaft $f$. This shaft is driven from the shaft $c$ by a pair of suitably-formed bevel-gears $g$ $g$. (See Figs. 8 and 9.) The form of gear which I preferably employ for this purpose is, as shown in the said Figs. 8 and 9, a variable gear of the well-known construction which will transmit motion from one shaft to another, whether such shafts are in line, at an angle, or parallel.

The tubes $b$ and $e$ terminate in cups $g'$ $g^2$, hinged to each other at $g^3$ and containing the gears $g$ $g$. The cup $g^2$ is fast on the tube $e$, but the cup $g'$ is loose on the tube $b$, thereby enabling the tube $e$ to be moved into any position with regard to the tube $b$. To the end of this shaft $f$ the clipping or shearing instrument $h$ is attached, and the said instrument may be of any well-known or suitable construction adapted to the particular work required to be performed. In order to obtain the necessary freedom of movement in any direction for the said instrument, it is not affixed directly to the end of the shaft $f$, but is connected thereto by any suitable device or devices which will provide the required flexibility. Thus, for example, in Figs. 1 and 2 I show a flexible shaft $i$ and a pair of bevel or variable gears $j$ $j$, but I may use a flexible shaft alone, or one or more pairs of variable gears alone, or the arrangement of bevel-gears described in the specification of my aforesaid British Patent No. 4,099 of 1887.

To the top of the aforesaid sleeve S or lower part W of the box thereon I affix a couple of long flat springs $k$ $k$, carrying at their outer ends a roller $l$, bearing against the tube $b$. These springs automatically raise the said tube, with its dependent tube $e$, clipper $h$, and connections, into a vertical or nearly vertical position, as shown in Fig. 1, and they are of such strength and proportions and so adjusted that the resistance they offer to the pulling down of the parts into the position shown in Fig. 2 when the clipper is in use is practically constant, for as the tube $b$ approaches a horizontal position the roller $l$ gradually approaches nearer to W W', so that though the resistance of the springs to bending increases the leverage to overcome such resistance increases, while the pressure of the tube on the roller necessarily increases as it approaches the horizontal position, and as the said springs afford an excess counterbalance to the moving parts only just sufficient to raise them to the position shown in Fig. 1 the resistance to the hand of the operator is very slight and, as just explained, practically constant, so that this arrangement, in combination with the freedom of movement of the tubes $b$ and $c$ around and about the standard R and of the tube $e$ about the tube $b$, enables the clipping instrument $h$ to be handled and moved with great ease and certainty in any position or direction, while the weight is taken almost entirely off the hand.

The springs $k$ $k$ may be cased with rubber or leather $m$ $m$, as shown, to prevent their chafing the tube $b$, and although in practice I prefer to employ a couple of springs a single spring may be used to serve the same purpose.

Figs. 10 and 11 represent two elevations, at right angles to each other, of a modification of the parts shown in Figs. 4 and 5, by means of which two clipping or shearing instruments can be driven by the same apparatus. In this case the spindle X and bearings $W^2$ $W^2$ on the lower part W of the box are extended in length, and the upper part W' of the box is in two parts W' W'. One part has projecting bearings $W^3$ $W^3$, embracing the bearings $W^2$ $W^2$, as before described with reference to Figs. 4 and 5, and the other part has bearings $W^4$ $W^4$, carried by wings $W^5$ $W^5$ and embracing the extensions of the bearings $W^2$ $W^2$. Each part W' is provided with a tube $b$, carrying a shaft $c$, operated by a bevel-pinion $d$ from the bevel-wheel $a$, and each of these tubes and shafts has connected to it a tube $e$ and shaft $f$, with clipping instrument, as before described. Two separate pairs of springs $k$ $k$ are attached to the sleeve S to counterbalance the tubes and shafts, so that the two clipping instruments can be operated and moved about quite independently of each other.

Fig. 12 represents in elevation another mode of driving two instruments from one apparatus. Here the machine is the same as that shown in Figs 1 to 9 as far as the top of the tube $b$. A frame $n$ is fixed to the end of the said tube and carries a horizontal spindle $p$, driven from the shaft $c$ by bevel-gears $q$ $r$. To each end of this shaft $p$ a tube $e$ is attached by cups $g'$ $g^2$, having hinges $g^3$ and containing shafts $f$, driven by gears $g$ $g$ and driving clipping instruments. The connections at the ends of the shaft $p$ are practically a duplication of the arrangement shown in Figs. 8 and 9.

No driving belts or cords are used in the machine, but the motion is imparted to the clipping instrument or instruments $h$ from the first-motion shaft D entirely through the medium of shafts and gearing, so that a positive motion is imparted without loss of power and speed or risk of stoppage.

When belts or cords are employed in such a machine, if slack, they slip and there is a loss of speed and power, and if tight enough to prevent slipping they are likely to break and absorb driving power to overcome the pressure thereby caused on the bearings. These objections are entirely overcome in my improved machine.

In the machine thus illustrated and described the lower portion included between the base A and sleeve S is substantially the same as in the machine described in the specification of my aforesaid British Letters Patent No. 4,293 of 1888, and I therefore make no claim to such lower portion; but,

Having now described my invention, what I claim as new, and desire to secure by Letters Patent, is—

1. In combination, the main support, the sleeve S, the piece W integral with said sleeve, the piece W' hinged to said piece W, the tube $b$ on said piece W', the springs $k$, $k$ fixed to W, with roller $l$, bearing on said tube $b$ and holding it normally in a vertical position, substantially as and for the purposes set forth.

2. In combination, the main support, the shaft Q, gearing driving the same, the sleeve S rotatable about main support, the hinged box W, W' on said sleeve, the tube $b$ on W' with contained shaft $c$, the gearing Z $a$ $d$, in said box W W' driving said shaft $c$, while by means of said sleeve S, box W, W' and gearing Z $a$ $d$, said shaft $c$ is capable of rotative and angular movement in relation to said main support, the vertical springs $k$, $k$, secured to W, the roller $l$ at their free ends bearing on said tube $b$ to automatically raise said tube $b$ to a vertical position when released, substantially as set forth.

3. In combination, the main support, the tube $b$, the shaft $c$ therein, the springs $k$ $k$, supporting the tube $b$, the shaft Q connected to the shaft $c$ for driving the same, said shaft being capable of angular movement in a vertical plane and rotary movement in a horizontal plane, with relation to the said shaft Q, the tube $e$ hinged to and hanging from the top of the tube $b$, the shaft $f$ in said tube $e$, the gearing $g$, $g$, between the shafts $c$ and $f$, the clipping instrument $h$ flexibly connected to and driven by said shaft $f$, the said instrument $h$ and shafts $c$ and $f$ being extensible in any direction from the main support, substantially as described.

4. In combination, the main support, the sleeve S, the piece W integral with said sleeve, the pieces W', W' hinged to said piece W, the tubes $b$ $b$ on said pieces W', the springs $k$ $k$ fixed to W, and supporting said tubes, the shafts $c$ $c$ within said tubes and driven from the shaft Q, by gearing Z, $a$, $d$, $d$, substantially as and for the purpose set forth.

5. In combination, the tube $b$ with shaft $c$, the frame $n$ with spindle $p$, the gears $q$ $r$ driving the spindle $p$ from said shaft $c$, the tubes $e$ $e$ hinged to and hanging from said frame $n$, and the shafts $f$, $f$, in said tubes $e$ $e$ driven from said spindle $p$ by gears $g$, $g$, $g$, $g$, substantially as and for the purpose set forth.

In witness whereof I have hereunto set my hand in presence of two witnesses.

W. CLARK.

Witnesses:
  AMBROSE A. MYALL,
  CHESTER DAWSON.